(12) United States Patent
Chen et al.

(10) Patent No.: US 9,141,936 B2
(45) Date of Patent: Sep. 22, 2015

(54) SYSTEMS AND METHODS FOR SIMULATING A RESOURCE CONSTRAINED PROCESS

(75) Inventors: Hong Chen, Cary, NC (US); Emily Lada, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 1072 days.

(21) Appl. No.: 13/046,156

(22) Filed: Mar. 11, 2011

(65) Prior Publication Data

US 2012/0035903 A1   Feb. 9, 2012

Related U.S. Application Data

(60) Provisional application No. 61/370,641, filed on Aug. 4, 2010.

(51) Int. Cl.
*G06Q 10/10* (2012.01)
*G06Q 10/06* (2012.01)

(52) U.S. Cl.
CPC ............ *G06Q 10/10* (2013.01); *G06Q 10/0631* (2013.01)

(58) Field of Classification Search
CPC ...................... G05B 19/41885; G06Q 10/0631
See application file for complete search history.

(56) References Cited

U.S. PATENT DOCUMENTS

| 4,604,718 A * | 8/1986 | Norman et al. ............... 703/6 |
| 4,796,194 A * | 1/1989 | Atherton .................. 700/103 |
| 5,140,537 A * | 8/1992 | Tullis ......................... 703/6 |
| 5,195,041 A * | 3/1993 | George et al. .............. 700/100 |
| 5,515,524 A * | 5/1996 | Lynch et al. ................. 703/13 |
| 6,086,617 A | 7/2000 | Waldon et al. |
| 6,108,662 A * | 8/2000 | Hoskins et al. ................. 700/95 |
| 6,268,853 B1 * | 7/2001 | Hoskins et al. ................. 700/83 |
| 7,099,745 B2 * | 8/2006 | Ebert ........................ 700/245 |
| 7,146,353 B2 * | 12/2006 | Garg et al. ..................... 1/1 |
| 7,460,920 B1 * | 12/2008 | Qu et al. .................... 700/101 |
| 7,548,879 B2 | 6/2009 | Cash et al. |
| 7,599,822 B2 | 10/2009 | Hearn et al. |
| 7,650,267 B1 | 1/2010 | Sturrock et al. |
| 7,668,703 B1 * | 2/2010 | Rolia et al. ................... 703/2 |

(Continued)

OTHER PUBLICATIONS

Banks, Jerry, "Getting Started with AutoMod", AutoSimulations, Inc., Aug. 2000 [512 pp.] —Provided by applicant on PTO 1449.*

(Continued)

*Primary Examiner* — Akash Saxena
(74) *Attorney, Agent, or Firm* — Kilpatrick Townsend & Stockton LLP

(57) ABSTRACT

Computer-implemented systems and methods are provided for simulation of a resource constrained process. Controlling entity definition data is received, wherein a controlling entity is configured to control resources using a control hierarchy. Resource definition data is received and populated into a resource data structure, wherein the resource is configured to control other resources using the control hierarchy. The resource constrained process is simulated, wherein simulating the resource constrained process includes propagating the controlling entity through the simulation of the resource constrained process, wherein the resource constrained process contains a plurality of stages, at a stage, associating a first resource with the controlling entity using the control hierarchy when the first resource is not allocated to another entity and the first resource fulfills the one or more resource rules, and generating simulation metrics as the controlling entity propagates through the simulation of the resource constrained process.

27 Claims, 10 Drawing Sheets

(56) References Cited

U.S. PATENT DOCUMENTS

| | | | |
|---|---|---|---|
| 7,676,035 B2* | 3/2010 | Werth et al. | 379/266.09 |
| 7,788,070 B2 | 8/2010 | Grichnik et al. | |
| 7,991,602 B2* | 8/2011 | Maturana et al. | 703/13 |
| 8,065,132 B2* | 11/2011 | Chen et al. | 703/22 |
| 8,103,486 B1* | 1/2012 | Rolia et al. | 703/2 |
| 8,175,863 B1* | 5/2012 | Ostermeyer et al. | 703/22 |
| 8,201,180 B2* | 6/2012 | Briscoe et al. | 718/104 |
| 2002/0120921 A1* | 8/2002 | Coburn et al. | 717/140 |
| 2003/0018464 A1* | 1/2003 | Khanna et al. | 703/21 |
| 2003/0200412 A1* | 10/2003 | Peinado et al. | 711/202 |
| 2004/0148144 A1 | 7/2004 | Martin | |
| 2004/0193393 A1 | 9/2004 | Keane | |
| 2004/0199372 A1 | 10/2004 | Penn | |
| 2005/0065937 A1* | 3/2005 | Degenaro et al. | 707/100 |
| 2005/0071212 A1* | 3/2005 | Flockhart et al. | 705/8 |
| 2005/0222834 A1 | 10/2005 | Riley | |
| 2005/0289020 A1* | 12/2005 | Bruns et al. | 705/28 |
| 2006/0031048 A1 | 2/2006 | Gilpin et al. | |
| 2006/0129970 A1 | 6/2006 | Haas et al. | |
| 2006/0217870 A1 | 9/2006 | Hoff et al. | |
| 2007/0124237 A1 | 5/2007 | Sundararajan et al. | |
| 2007/0179769 A1 | 8/2007 | Grichnik et al. | |
| 2008/0052719 A1* | 2/2008 | Briscoe et al. | 718/104 |
| 2008/0091403 A1* | 4/2008 | Harrison et al. | 703/17 |
| 2008/0235166 A1 | 9/2008 | Sayyar-Rodsari et al. | |
| 2008/0300705 A1* | 12/2008 | Bagchi et al. | 700/100 |
| 2009/0006133 A1 | 1/2009 | Weinert et al. | |
| 2009/0024367 A1 | 1/2009 | Grichnik et al. | |
| 2009/0037153 A1 | 2/2009 | Grichnik et al. | |
| 2009/0312992 A1* | 12/2009 | Chen et al. | 703/2 |
| 2010/0070397 A1* | 3/2010 | Hahn-Carlson et al. | 705/34 |
| 2011/0040549 A1* | 2/2011 | Ciarallo et al. | 703/17 |
| 2011/0251866 A1* | 10/2011 | Sengupta | 705/7.12 |
| 2011/0255682 A1* | 10/2011 | Flockhart et al. | 379/265.03 |
| 2012/0035903 A1* | 2/2012 | Chen et al. | 703/21 |
| 2012/0191233 A1* | 7/2012 | Zwanziger | 700/95 |
| 2013/0024226 A1* | 1/2013 | Bourke | 705/7.12 |

OTHER PUBLICATIONS

Burney, S.M. Aqil, "Simulation of Systems," pp. 1-16 (Mar. 10, 2008).
Prodan, Augustin et al., "Stochastic simulation and modeling," pp. 461-466 (2001).
Banks, Jerry, "Getting Started with AutoMod", AutoSimulations, Inc., Aug. 2000 [512 pp.].
Gray, Michael A., "Discrete Event Simulation", IEEE, Computing in Science & Engineering, vol. 9, Issue 6, pp. 62-66 (Nov./Dec. 2007).
Running Simulations Repeatedly:: Using Statistics (SimEvents®), http://www.mathworks.com/access/helpdesk/help/toolbox/simevents/ug/bp4wv3c.html (3 pp.).
Varying Simulation Results by Managing Seeds:: Using Statistics (SimEvents®), http://www.mathworks.com/access/helpdesk/help/toolbox/simevents/ ug/bp5eimf.html (3 pp.).
Anylogic User's Manual, XJ Technologies Company Ltd., www.xjteck.com, 1992-2005 [430 pp.].
Arena Basic User Guide, Rockwell Automation Technologies, Inc., Nov. 2007 [90 pp.].
ExtendSim Overview, http://www.extendsim.com/prods_overview.html [12 pp.].

* cited by examiner

SYSTEMS AND METHODS FOR SIMULATING A RESOURCE CONSTRAINED PROCESS

CROSS REFERENCE TO RELATED APPLICATIONS

This application claims priority to U.S. Provisional Patent Application No. 61/370,641, filed Aug. 4, 2010, entitled "Systems and Methods for Simulating a Resource Constrained Process." The entirety of which is herein incorporated by reference.

FIELD

The technology described herein relates generally to resource management and more specifically to simulation of resource constrained processes.

BACKGROUND

Simulations are useful in modeling the flow of transactions through processes, such as in the field of sales process engineering, to study and improve the flow of customer orders through various stages of completion (e.g., from an initial proposal for providing goods/services through order acceptance and installation). Such simulations can help predict the impact of how improvements in methods might impact variability, cost, labor time, and the quantity of transactions at various stages in the process. A full-featured computerized process simulator can be used to depict such models, as can simpler educational demonstrations using spreadsheet software.

SUMMARY

In accordance with the teachings herein, computer-implemented systems and methods are provided for simulation of a resource constrained process, wherein the resource constrained process contains a controlling entity and resources. Controlling entity definition data may be received and populated into a controlling entity data structure, wherein a controlling entity is configured to control a first resource using a control hierarchy. Resource definition data may be received and populated into a resource data structure, wherein the first resource is configured to control a second resource using the control hierarchy. The resource constrained process may be simulated, wherein simulating the resource constrained process includes propagating the controlling entity through the simulation of the resource constrained process, wherein the resource constrained process contains a plurality of stages, at one of the stages, associating a first resource with the controlling entity using the control hierarchy, at a subsequent stage, associating a second resource with the first resource using the control hierarchy, and generating simulation metrics as the controlling entity propagates through the simulation of the resource constrained process. The resource constrained process may be modified according to the generated simulation metrics.

DETAILED DESCRIPTION

Described herein are systems and methods that model resources in the context of a discrete event simulation model as special types of entities that can be assigned attributes and flow through the model. These mobile resource entities can be processed by modeling blocks for regular entities, and the mobile resource entities can be seized by other entities to fulfill resource demands. To fulfill other entities' demands, a mobile resource entity is located, requested, and allocated. Locating specific resource entities in a model is also useful for other resource operations, such as scheduling, statistics collection, and preemption. Resource entity rules (e.g., Boolean expressions that the attributes of the targeted resource entities must satisfy) may be used to locate mobile resource entities in a model. Once the mobile resource entities have been allocated to a controlling entity to satisfy a demand, an entity hierarchy may be formed with the controlling entity at the top (parent) level and each seized resource at the next (child) level. The controlling entity then continues to flow through the simulation model, along with its resource entities, until the resource entities are released. This hierarchical, entity—based approach, together with the specification of resource entity rules, provides a unique and powerful method for resource management that has many advantages over alternative techniques, especially in the areas of resource scheduling and preemption.

Figure 1:
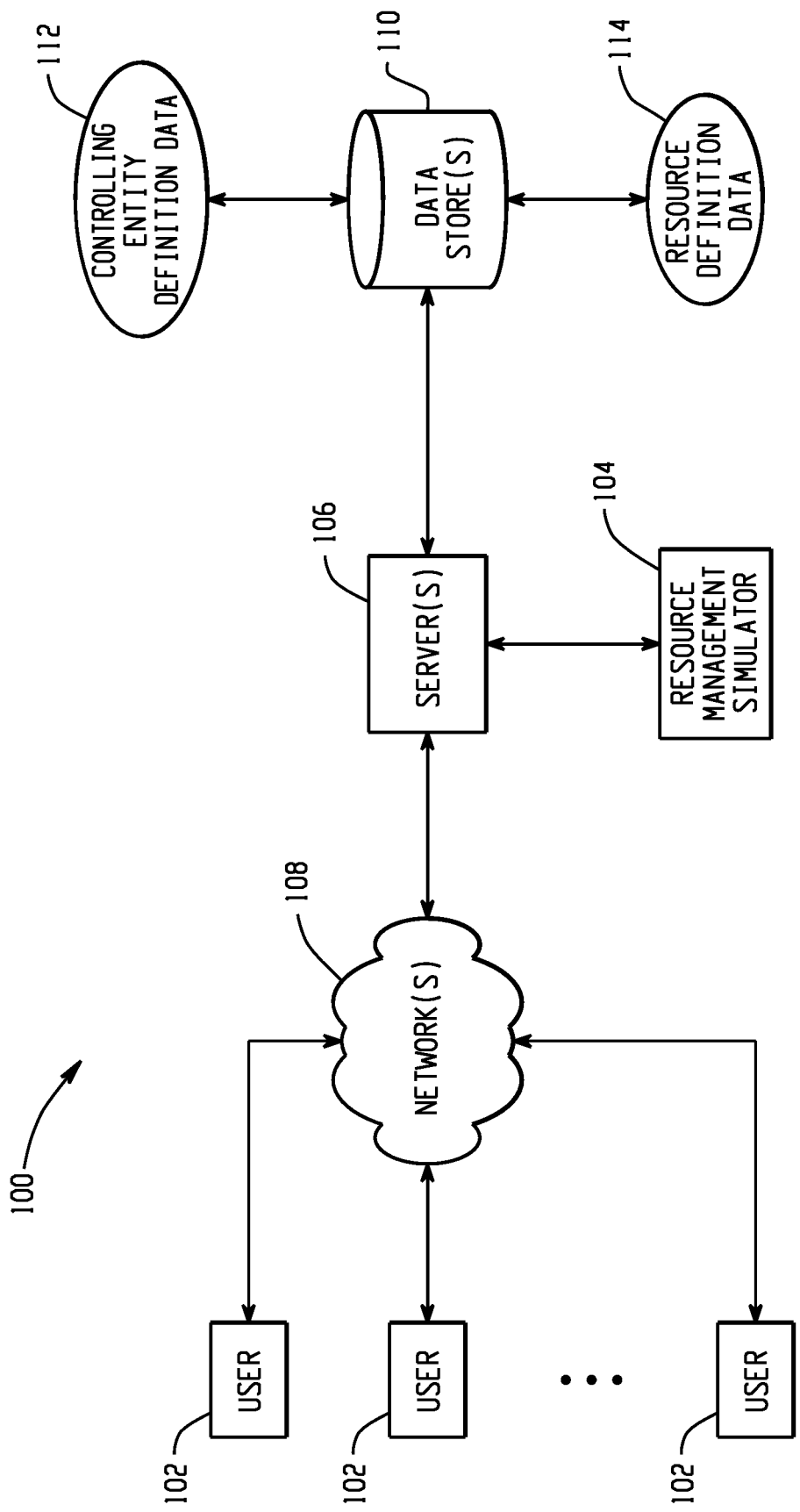
FIG. 1 depicts a computer-implemented environment wherein users can interact with a hierarchy manager hosted on one or more servers through a network.

FIG. 1 depicts a computer-implemented environment wherein users 102 can interact with a resource management simulator 104 hosted on one or more servers 106 through a network 108. A resource management simulator 104 may be utilized in a variety of ways. For example, one or more users 102 can interact with the system 104 over one or more networks 108. One or more servers 106 accessible through the network(s) 108 can host the resource management simulator 104. The one or more servers 106 are responsive to one or more data stores 110 for providing input data to the resource management simulator 104. Among the data contained on the one or more data stores 110 may be controlling entity definition data 112 as well as resource definition data 114. It should be understood that the hierarchy manager 104 could also be provided on a stand-alone computer for access by a user 102.

A resource management simulator 104 may be used in a variety of contexts. For example, a resource management simulator 104 may be used in a SAS Simulation Studio Application. SAS Simulation Studio is a SAS application that uses object-oriented, discrete-event simulation to model and analyze systems. Simulation Studio is based on the Java programming language and is a flexible, general purpose, object-oriented discrete-event simulation package designed to provide the necessary modeling and analysis tools for both novice and advanced users. To facilitate the construction of simulation models, a visual programming environment based on a flow chart paradigm is provided with various fundamental modeling objects or constructs, including entities, data values, blocks, ports, and links. During a simulation, entities and data values can travel among blocks for various processing needs. In general, values are information such as numbers, character strings, and Boolean values. An entity is a discrete object that can traverse a simulation model and be assigned attributes, or properties. Entities can be used to represent physical or conceptual components in a model, such as telephone calls in a telecommunications system, customers in a retail store, or ships in a harbor.

In Simulation Studio, blocks are the most fundamental units used to build a model. Each block usually encapsulates some well-defined and specialized functionality. Communication between blocks is accomplished through ports. Blocks have two types of ports: value ports and entity ports. Furthermore, each port can either be an input port or an output port. For example, an output value port on a queue block is the length of the associated queue of waiting entities. Generally, an input port is used to get information into the block, and an output port is used by the block to either push information out or used by another block to pull information from the block. In Simulation Studio, a link is created between the ports on blocks to define a path for values or entities to flow.

SAS Simulation Studio avoids being simply a black box that takes model inputs and mysteriously produces model outputs. Rather, SAS Simulation Studio includes features that enable one to customize models and tailor the application to meet specific modeling needs. One modeling feature in particular that can be customized in SAS Simulation Studio is resource management. In general, a resource is a system component that provides a service. Examples of resources in manufacturing systems include machines, operators, space on a conveyor, space in storage for finished products, cranes, and forklifts. Resources in a hospital include nurses, doctors, operating rooms, and beds in a recovery room. The users (or consumers) of resources are entities. In some instances, the available resources in a model might be unlimited, while in others the number of units of a resource might be limited, or fixed. In the latter case, entities are required to wait for use of the resource. The number of available resource units may also vary throughout a simulation run, perhaps governed by a predefined schedule. Resources are a part of most simulation models because they often control or restrict the flow of entities. Many discrete-event simulation models contain a resource of some type, whether it is a runway at an airport, a cashier at a grocery store, or a parking garage with a finite number of spaces for cars.

Resource management schemes are largely dictated or influenced by how resources are actually represented in the modeling software. There are several possible ways to define resources in a general purpose simulation environment. The simplest way is to model resources with a number. The number usually represents resource capacity and can be managed, for example, by a resource pool. This approach, however, assumes the resources are homogeneous and have no individual identity or attributes. This may force a user to make simplifying assumptions in complex situations, especially when trying to model preemption.

Resources can also be defined as special objects. These resource objects usually contain a number for capacity and possibly other attributes as well, but they are not entity objects. As a result, dedicated constructs or special treatments can be provided for the delivery and management of these resource objects. In some systems, dynamic resource objects are allowed to move along the pathways in a simulation model and compete for node usage. As a result, those systems' dynamic resources have much in common with its entities, although the resources are not actual entities.

Finally, resources can be represented as entities. In some simulation systems, it is possible to model resources using regular entities without any explicit resource representation. These entities can be stored in a queue and later matched with other entities using a batching mechanism to mimic the seizing of resources to fulfill a demand.

On the other hand, the object-oriented simulator of another system may define resources as a special type of entity since entities and resources have a great deal of overlapping characteristics and behavior in an object-oriented simulation environment. The concept of a resource entity takes advantage of the rich entity processing capability in a simulation environment, resulting in less special treatment and required support for resources.

In SAS Simulation Studio, resources are defined as a special type of entity. SAS Simulation Studio offers a graphical user interface so that programming is not required by the user. In addition, because the entities in Simulation Studio can be hierarchical, the resource entities can be used to organize many levels of child resources. The resource entities are able to seize other resource entities, and the resulting entity hierarchy may be used like a regular resource entity (e.g., the entity hierarchy may be seized, released, scheduled, and preempted), which greatly facilitates the modeling of a collection of resources in complex situations.

In SAS Simulation Studio, an object-based approach to resource management is taken. In particular, systems modeled in SAS Simulation Studio can use two kinds of resource objects: stationary resources and mobile resources. The following subsections introduce both types of resource objects.

Stationary Resources

Entity holding blocks (such as queues, servers, and delay blocks) represent stationary resources in a SAS Simulation Studio model. These stationary resources are static, created at model building time, and used to model one type of resource. Holding blocks have a capacity, which may be infinite, and hold or delay entities for some period of time. Entities may compete for available space in a holding block. This is in contrast to non-holding blocks, such as a Switch block, which entities flow through without the simulation clock advancing.

Figure 2:
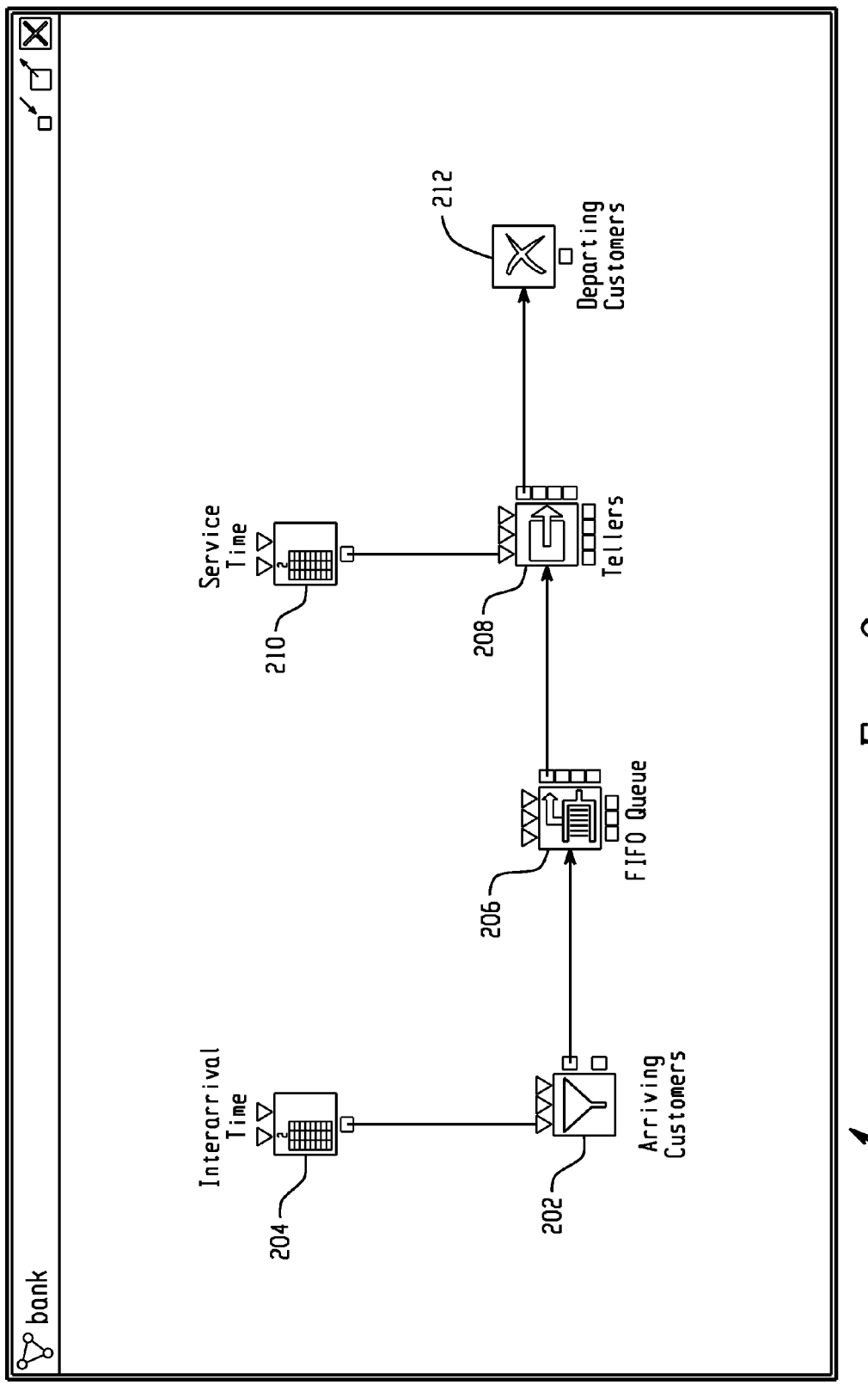
FIG. 2 depicts the banking system model in SAS Simulation Studio using stationary resources.

To illustrate the use of stationary resources, FIG. 2 depicts a SAS Simulation Studio model of a simple banking system in which there are three tellers and one queue for customers to wait. Customer arrivals to the bank are modeled using an entity generator block, labeled arriving customers 202. The numeric source block, labeled interarrival time 204, generates a sample from a specified distribution, and the entity generator block pulls that value through its InterArrivalTime value port to schedule the arrival time of the next customer to the bank. When an entity, representing a bank customer, leaves the entity generator block, the entity is pushed to a queue block 206, labeled FIFO queue. The queue block 206 in this model has infinite capacity and a first-in-first-out queueing discipline. When an entity arrives at the queue block 206, the queue 206 attempts to push the entity to a server block 208, labeled tellers. The server block 208 has a specified capacity of three and represents the three bank tellers. If a unit of the server 208 is available (e.g., one of the bank tellers is idle), then the server block 208 accepts the customer entity. Otherwise, the entity waits in the queue 206. When a unit of the server 208 becomes available, the server unit requests an entity from the queue 206. When an entity arrives at the server block 208, a service time is sampled from the numeric source block 210 labeled ServiceTime and pulled by the server 208 through the InServiceTime value port. Once the entity completes service, the entity is pushed to the disposer block 212, labeled Departing Customers, where the entity leaves the system.

In the model shown in FIG. 2, there are two stationary resources: the queue block 206 with infinite capacity and the server block 208 with finite capacity. Both blocks hold entities for some time period and represent one type of resource. Using a holding block, such as a queue 206 or a server block 208, is one way to model resources in SAS Simulation Studio. However, if the system being modeled has a complex resource structure (e.g., so that several different types of resources are required simultaneously to fulfill a demand), then mobile resources may be used.

Mobile Resources

Mobile resources, which are usually dynamic and created during the simulation run, are resource objects that flow in the model. Mobile resources are a special type of entity and may possess all the capability and attributes of regular entities. Mobile resources can be processed and managed by blocks for regular entity objects. Resource entities in SAS Simulation Studio have a predefined entity attribute named ResourceUnits, which is the capacity (e.g., number of units) of the resource. While the ResourceUnits attribute has special uses for resource entities, the attribute may also be used as an ordinary numeric entity attribute for modeling purposes. In addition to the ResourceUnits attribute, each resource entity also has run-time state information, such as seized status and resource state, which is used by the simulation system to perform resource management during a simulation run. From a user's point of view, the resource state can be either functional or nonfunctional. The functional resource entities can be allocated to other entities to fulfill resource requirements.

Figure 3:
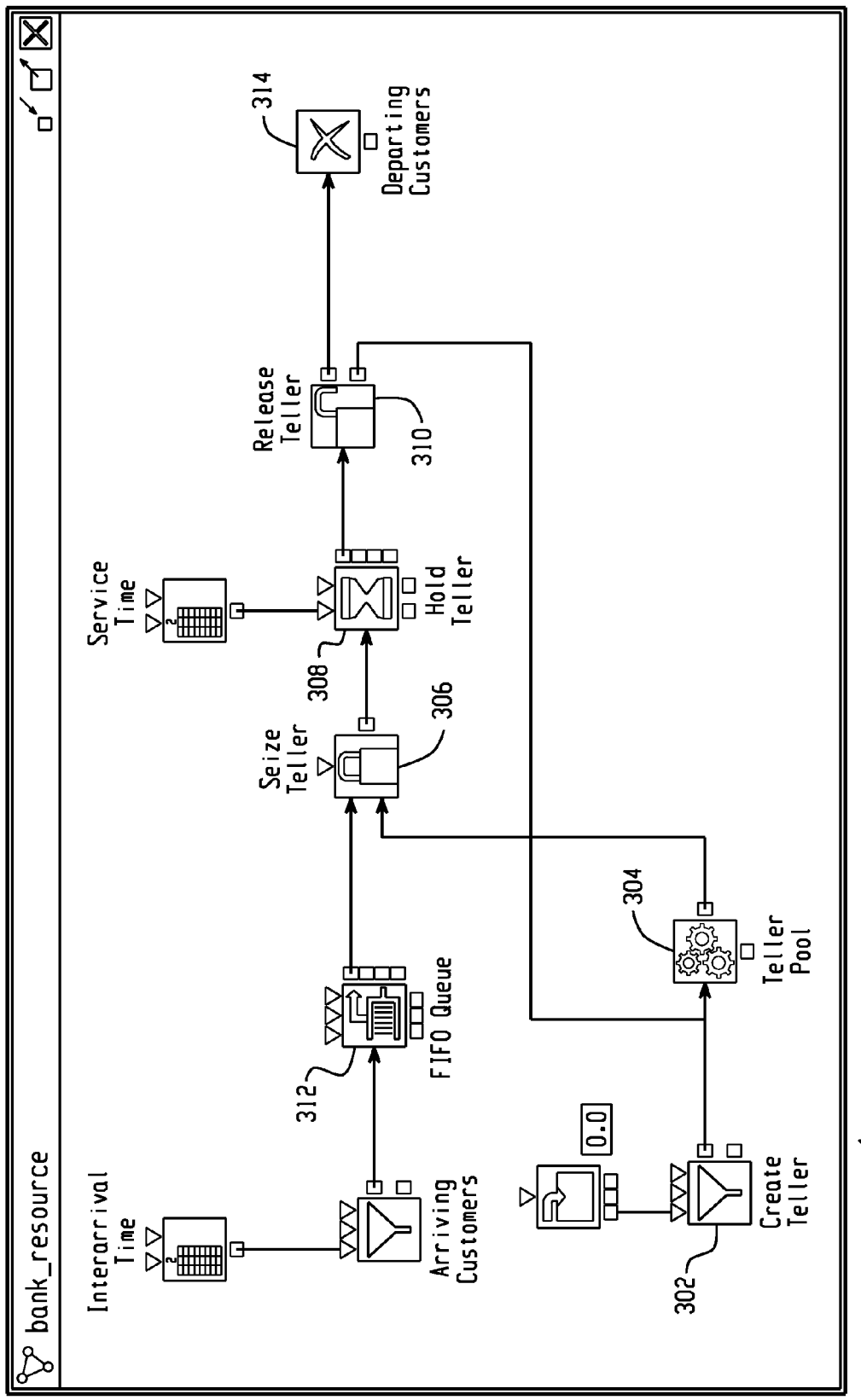
FIG. 3 depicts the banking system model in SAS Simulation Studio using mobile resources.

Resource entities may be seized by other entities, including other resource entities, in a simulation model. In FIG. 3, a Simulation Studio model of a similar banking system as described in FIG. 2 is shown where the tellers are now modeled as mobile resource entities instead of with a static server block. In the model in FIG. 2, the bank tellers are a stationary resource, which never flow or move through the model. In FIG. 3, the bank tellers are modeled as resource entities, and the bank tellers are created at model run-time. The entity generator block 302, labeled create teller, generates three resource entities, one for each teller, at time zero and sends those entities into a resource pool block 304, labeled teller pool, to wait until needed. The arrival of customers to the bank is modeled the same way as in FIG. 2. However as shown in FIG. 3, a seize block 306, labeled seize teller, a resource pool block 304, a delay block 308, labeled hold teller, and a release block 31, labeled release teller, work together to mimic the functionality of the server block in the model in FIG. 2.

When a customer entity arrives at the FIFO queue block 312, the queue block 312 notifies the seize block 306 that a customer is waiting. The seize block 306 then checks to see if a bank teller resource entity is available in the resource pool block 304. The seize block 306 performs a resource availability check by executing one or more queries to one or more resource pools to determine whether sufficient resources are present in resource pools 304 to fulfill a controlling entity or resource's resource needs. The resource availability check queries the one or more resource pools 304 to see if a sufficient number of resources that meet specified resource rules are available for use. For example, a resource rule could identify a number of tellers needed and a required amount of experience required of those tellers to service a particular customer. Another example resource rule could specify that one teller is needed from a teller pool 304 and one manager is needed from a manager pool to service a particular customer.

Resource rules may be utilized in the resource management simulator in a variety of other contexts as well. For example, resource rules may be utilized in locating resources, scheduling resources, allocating and deallocating resources, closing resources, and other contexts.

With reference back to FIG. 3, the seize block 306 performs a resource availability check to determine if a bank teller resource entity is available in the resource pool block 304. If one is not available, then the customer entity stays in the queue 312. If a bank teller resource entity is available, then the seize block 306 accepts the customer entity from the queue block 312, pulls the bank teller resource entity from the resource pool block 304, and attaches the bank teller resource to the customer entity. At this point, a hierarchy of entities is formed. At the top level is the customer entity, called the parent, or root entity, and below the customer entity is the teller resource entity, called the child entity. When the customer entity flows through the simulation model, the customer entity brings the teller resource entity. After seizing a teller resource entity, the customer entity is sent to a delay block 308 where the customer entity is held along with the teller resource entity until service is completed. The customer entity is then routed to a release block 310 where the bank teller resource entity is extracted from the customer entity. The two entities flow out different ports on the release block 310: the customer entity is routed to a disposer block 314, labeled departing customers, and the teller resource entity is routed back to the resource pool block 304, where the teller resource waits to be seized by another customer entity.

For this simple banking system, using a stationary resource (e.g., a server block as shown in FIG. 2) to model the bank tellers is sufficient and mobile resources are not really required. However, suppose at some point a bank teller requires the assistance of a manager. For this scenario, the bank tellers can be modeled as mobile resource entities as in FIG. 3. After seizing a teller resource entity, a customer entity could then seize a manager resource entity. Following a delay representing service time, the customer entity could then release both the teller resource entity and the manager resource entity simultaneously, or the customer entity could release them at different points in the model. By modeling the resources as entities in this example, the user has more flexibility, and it is possible to more easily model complex scenarios.

A control hierarchy associated with a controlling entity can take a variety of forms. For example, a control hierarchy data structure could maintain a description of all the resources that are associated with a controlling entity and further resources that are associated with the control entity's resources. For example, a control hierarchy data structure could specify one or more tellers associated with a customer performing a transaction at a first level, and a second level could further identify one or more managers associated with one of the tellers associated with the customer. Disparate types of resources could also be maintained on a single level of the control hierarchy. For example, a first level of the control hierarchy could include a teller that is associated with a customer as well as an identification of an account associated with the customer.

An entity-based approach to resource modeling facilitates the modeling of scenarios that require multiple types of resources simultaneously. Any entity can seize multiple resources of different types simultaneously and then release them, sometimes partially, as needed. Because the released resources are also entities, the released entities can either flow to a holding block (e.g., a resource pool) where they wait to be seized by another entity, or the released entities may flow to other blocks in the model before returning to a resource pool block. For example, suppose a doctor needs to complete paperwork before seeing the next patient. This scenario may be modeled in SAS Simulation Studio by sending the doctor resource entity to a delay block representing the paperwork completion time before sending the doctor resource entity back to a resource pool where the doctor resource entity can subsequently be seized by another patient entity.

Even though the individual resource entities may be scattered throughout a model during a simulation run, a specific resource entity may be located by using resource entity rules. Resource entity rules may be defined using entity characteristics such as type and attribute values. Once a resource entity is located, the state or capacity of the resource can be adjusted as needed according to a resource schedule. With resource scheduling comes the issue of resource preemption, which may be modeled with an entity-based approach to resource management. SAS Simulation Studio provides the user with constructs to control resource preemption, including the specification of which resource to preempt, the number of units to preempt, and where the preempted resource should be routed in the model (if necessary).

Identifying and applying design patterns to handle various reoccurring situations can greatly improve the design, implementation, understanding, and usage of computer software systems. A resource usage pattern is proposed to describe various usages of resource entities in SAS Simulation Studio. This common usage pattern for resource entities consists of the following fundamental steps:

1. Creating,
2. Storing,
3. Locating,
4. Allocating,
5. Using,
6. Deallocating, and
7. Disposing.

Each of these steps might use one or more SAS Simulation Studio blocks. In addition to all the regular modeling blocks, there are six resource-specific blocks available in SAS Simulation Studio: the seize, release, resource pool, resource scheduler, resource agenda, and resource stats collector blocks.

Resource entities in SAS Simulation Studio are usually created by an entity generator block, just as regular entities are. The entity generator block provides the user with options to select what type of entity will be created. Within the entity generator block, it is possible to select the DefaultResourceEntity type with a predefined ResourceUnits attribute for generation, or the user can define a new resource entity type that includes additional custom attributes. The initial value of all attributes, including ResourceUnits, can also be set in the entity generator block.

After a resource entity is created, it is typically sent to a resource pool block for storage before it can be seized and allocated to meet a resource demand. The resource pool block performs resource management tasks for resource entities, such as maintaining seize/unseize status, and processing resource requests. A resource entity is considered unseized if it resides in a resource pool block. The resource entity is considered seized if it leaves the pool and is not directly held by any other resource pool block. A newly created resource entity is also considered unseized before it enters a resource pool block.

Resources need to be located, requested, and allocated to fulfill other entities' resource demands. Locating resources is also essential for other resource operations, such as scheduling, statistics collection, and preemption. SAS Simulation Studio uses resource entity rules (e.g., Boolean expressions that the attributes of the targeted resource entities can satisfy) to locate resource entities. The resource needs or constraints of an entity that enters a seize block are referred to as a controlling entity and can be specified as resource entity rules in the seize block. A seize block provides an input resource entity port for each resource need or constraint. The input resource ports can be connected with resource pool blocks. During a simulation run, the seize block uses the links to its input resource ports to locate and request resource entities from resource storage blocks to satisfy the resource needs of the controlling entity.

After locating the resources in the resource pool blocks, the seize block requests the resources. The resource pool blocks process the requests and allocate the resources to the seize block. In the resource pool block, only those resource entities with a resource state set to functional can be allocated. To decrease the likelihood of a resource deadlock, a single seize block in SAS Simulation Studio may not support partial allocation of the resources it is requesting. All resource constraints may be satisfied before resources are actually allocated to a controlling entity. Otherwise, the seize block may not accept the controlling entity's resource request, and the controlling entity can wait in a queue block for all required resources to become available. If partial allocation is required, then a chain of seize blocks may be used to seize different subsets of resources, one after another, as they become available.

Once the resource entities have been allocated to a controlling entity, an entity hierarchy is formed with the controlling entity at the top (parent) level and each seized resource at the next (child) level. The controlling entity then typically continues to flow through the model, along with its seized resource entities. As a simple example of how resources are used, the controlling entity might move to a delay block to represent a processing time and then move to a release block to have the resource entities deallocated. In a more complicated system, such as an emergency room, it is not hard to imagine resource entities staying with a controlling entity as it flows through various parts of the model. When a patient enters an emergency room, the patient might be assigned a nurse, a doctor, and a surgery room for some time period. After the surgery, the doctor and surgery room might be released from the patient, but the nurse might stay with the patient, and a recovery room might be added as a resource. In another example, parts could be modeled as resource entities, and parts could be continually added to a controlling entity as the controlling entity progresses down an assembly line. In this case, the controlling entity will never release the resource entities since the resource entities are essentially consumed to build the final product.

Resources seized by controlling entities can be released (e.g., deallocated, unseized) by using a release block. Resource constraints, such as resource entity rules, can be defined on the release block to locate targeted resource entities within the controlling entity hierarchy. The release block provides an output resource entity port for each constraint defined. For each controlling entity that enters the release block during the simulation run, the user-defined resource constraints are used to locate and deallocate the targeted resources among all resources held by the controlling entity. The deallocated resources flow out the appropriate output resource ports on the release block. Released resources can be routed to any block in the simulation model as dictated by the system logic. For example, a resource entity can be processed like a regular entity and have its attributes adjusted in a modifier block or be held in a server block for a period of time. Routing the resource entities back to a resource pool block indicates that the resource entities are available to be seized by other entities.

Like regular entities, resource entities can be disposed by a disposer block in SAS Simulation Studio. Resource entities that are attached to a controlling entity that enters a disposer block may be destroyed along with the controlling entity. Disposing resource entities with a disposer block may affect the total resource capacity available in the simulation model.

Resources often undergo routine adjustments, or changes, and the effects of such adjustments can last for a limited period of time. Examples include a truck that can undergo routine maintenance, a worker that requires a lunch break, and the addition of sales people for the holiday shopping season. The scheduling of resource adjustments may address the following issues:

a. What kind of adjustment to make (capacity or state change);
b. What resources to adjust (locate the targeted resources);
c. When to make the adjustment and for how long;
d. Whether or not the adjustment is preemptive;
e. When to proceed to the next related adjustment; and
f. Whether or not to repeat the adjustment in the future (is it repeatable or not).

In SAS Simulation Studio, the scheduling of mobile resources is supported by the resource agenda and resource scheduler blocks together. The resource agenda block addresses the first issue above, and the resource scheduler block addresses the remaining issues.

Figure 4:
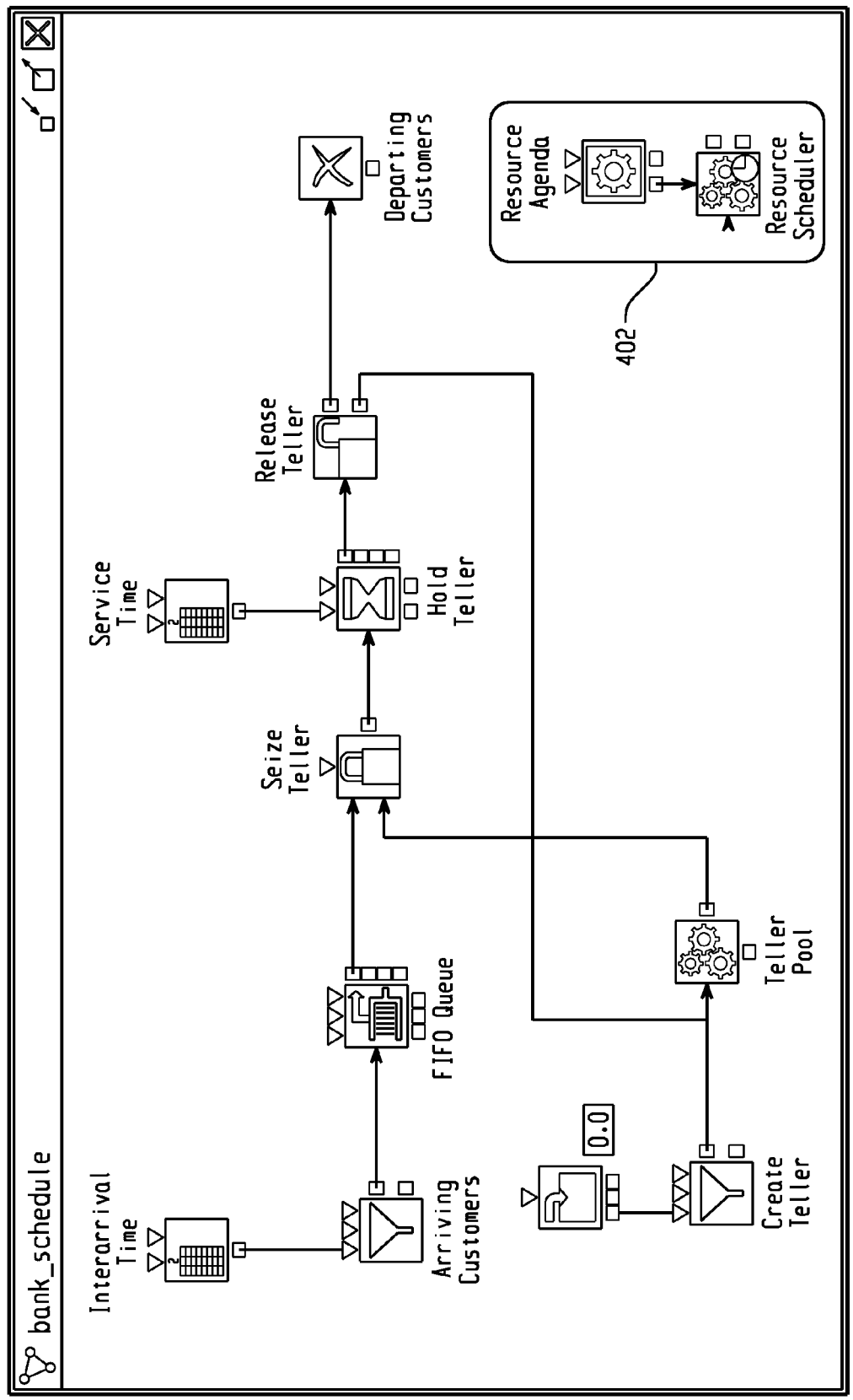
FIG. 4 depicts the banking system model in SAS Simulation Studio using scheduled mobile resources.

Resource adjustments are often related and happen in an orderly fashion. In SAS Simulation Studio, related adjustment actions can be grouped together. A special type of value object, called a resource agenda, defines a sequence of related resource adjustment actions based on a relative simulation time. Each resource adjustment action, called an agenda entry, includes a change to either the resource capacity value or the resource state value in targeted resource entities over a certain time period. The Resource Agenda block provides a resource agenda to describe what kind of resource adjustments to make during a simulation run. In the banking system example, the tellers may have staggered lunch breaks. An agenda could be defined over one day to indicate the number of tellers available and for how long. FIG. 4 shows a similar banking system model as in FIG. 3 with the addition of the resource agenda and resource scheduler block to model the teller lunch breaks.

The resource scheduler block 402 accepts and stores resource agenda objects during a simulation run and handles items (b)-(f) in the above list. During a simulation run, the resource scheduler block 402 locates the targeted resource entities among the resources in the system dynamically using entity search rules, which may be, for example, an attribute value. These targeted resource entities are either unseized and located in resource storage blocks, such as a resource pool block, or seized by a controlling entity. The seized resource entities are busy and in use. In the nonpreemptive case, the seized resource entities should not be adjusted according to the schedule until they become unseized. In the preemptive case, the capacity of the seized entities is decreased, or the state is changed to nonfunctional, according to the resource schedule and the scheduled adjustment is considered disruptive to those resources. In this case, the seized resources are deallocated from their current controlling entity for further processing or allocation. Options are available, called "Immediate Actions" rules, in the resource scheduler block 402 to allow the user to specify how a specific agenda entry is to be processed for a targeted set of resource entities and whether or not the specific agenda entry should be preemptive.

The resource scheduler block 402 may use several heuristics to process agenda entries. For an increase in capacity, the resource scheduler block divides the increased units evenly among all targeted resource entities, where the resource entities affected are specified in the resource scheduler block based on entity type or attribute value. For a total decrease of capacity, the resource scheduler block 402 attempts to decrease as much capacity as possible from a first targeted resource entity before locating the next target, and so on. For example, if there are four bank teller resource entities in the model, each with capacity one, and at a specific time the agenda entry indicates the total capacity for the bank teller resource should be two, then the first bank teller resource entity will be located and its capacity will be decreased from one to zero. At that point, another teller resource entity will be located and that teller's capacity will also be decreased from one to zero. Thus, the total capacity of the teller resource is decreased from four to two. In general, the resource scheduler block 402 always attempts to finish processing a resource agenda entry without preemptive changes. For capacity changes, the currently unseized resources are located and adjusted first. This "unseized first" heuristic decreases the waiting time for the seized resources to become unseized and avoids unnecessary preemptive adjustments.

In SAS Simulation Studio, two types of resource preemptions are supported: priority-based and scheduled. Priority-based preemption is primarily for preempting stationary resources, such as entity holding blocks, which include the queue, server, and delay blocks. An entity that wants to enter a holding block is considered a consumer of the static resource represented by that block. Allocation of static resources usually involves the acceptance of entering entities into the holding blocks to occupy space. Preemption of static resources forces out one or more entities currently holding a space in the block so that the space can be given to some other entity. The preempted entity is pushed out a dedicated preemption port and can be routed to any part of the model, as dictated by the system logic.

To handle priority-based preemption, SAS Simulation Studio provides an object named entity group that is a collection of entity references. An entity reference contains information that uniquely identifies a particular entity. Therefore an entity group holds information about a collection of entities but not the actual entities themselves. The SAS Simulation Studio holding blocks (including the queue, server, and delay) provide an InPreempt input port that accepts an entity group object as input. These blocks compare the entity references in the entity group to the entities currently held by the block and preempt any matches. With this design, it is possible to preempt any number of units of a stationary resource. This type of preemption is often triggered by the higher priority of a new entity attempting to enter a holding block that does not have any more space. Determining which entities to preempt from service is very specific to the system being modeled, and the entity group construct allows the user to control exactly which entities are preempted.

Figure 5:
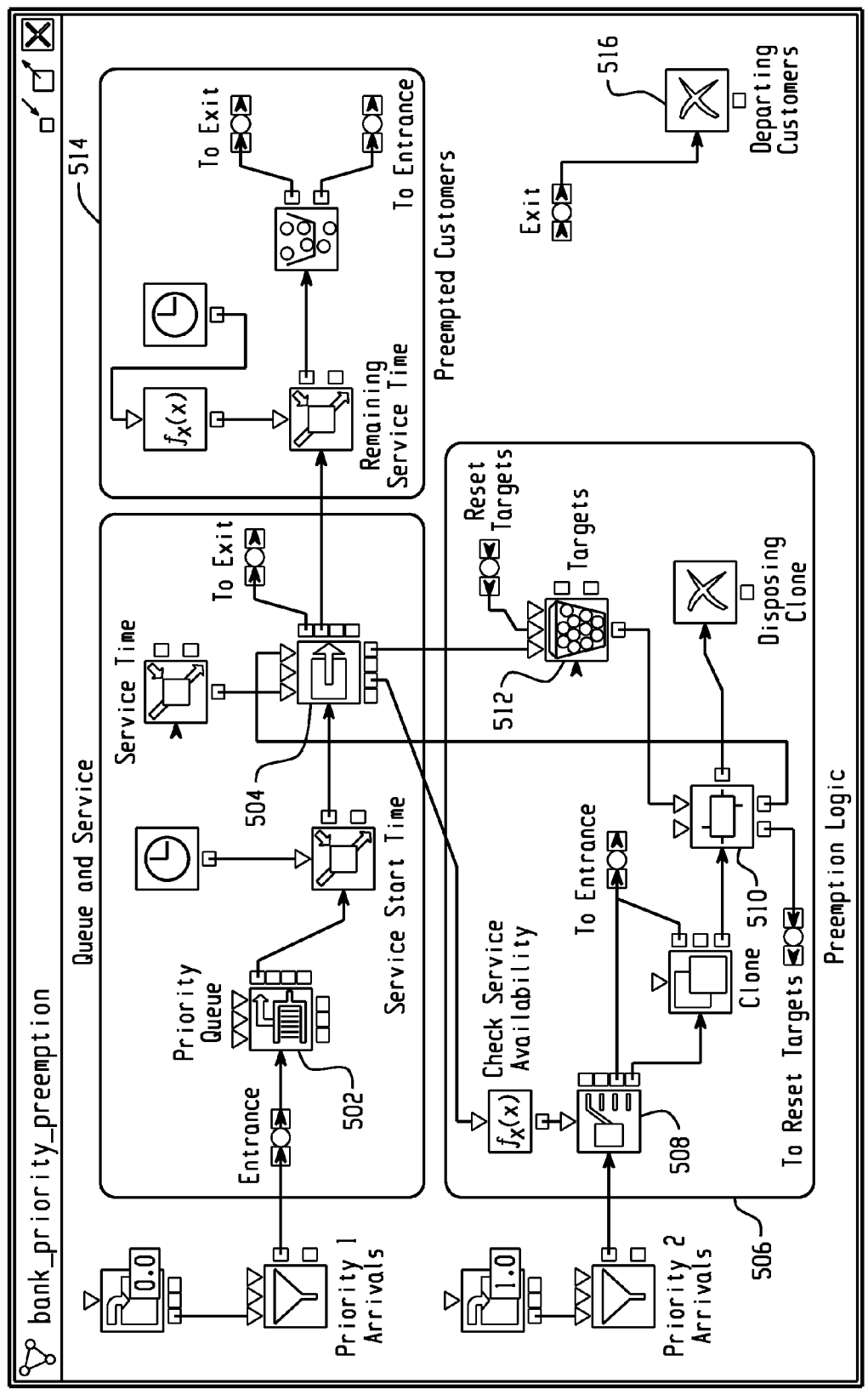
FIG. 5 depicts an example of priority-based preemption in SAS Simulation Studio.

FIG. 5 shows an example of how priority-based preemption can be modeled in SAS Simulation Studio. In this model, higher-priority customers can preempt lower-priority customers who are already receiving service if all units of the server are busy. The preempted customers wait for a server to become available again so they can complete their remaining service time. Entities with a priority attribute with value 1 are generated and sent immediately into a queue block 502 labeled priority queue that is ordered based on the value of the attribute priority, such that entities with high values of priority are at the front of the queue and will receive service first. Entities in the priority queue block 502 wait for service from one of three servers modeled with a server block 504 with capacity three. When entities with a priority attribute with value 2 are generated, those entities are routed to the preemption logic section 506 of the model. A priority 2 entity first enters a switch block 508 where the availability of a server is checked. If a server 504 is available, then the priority 2 entity is routed to the priority queue block 504. If all units of the server 504 are busy, then a check is made to see whether a priority 1 entity is currently in service so that the priority 1 entity can be preempted. At this point, the priority 2 entity is cloned and the original entity is sent to the front of the priority queue block 502 to wait for the possible preemption of a priority 1 entity. The cloned priority 2 entity is sent to a gate block 510 where the entity group block 512 labeled targets is triggered to pull information on all the entities currently being held in the server block 504. Also within the entity group block 512 are entity rules specifying which entity should be preempted (e.g., in this case, a single entity with priority attribute equal to 1). The entity group block 512 attempts to find an entity among all the entities being held in the server block 504 that satisfies the specified rules. The resulting entity group, which is a reference to either one entity or none if there are currently no priority 1 entities in service, is passed to the gate block 510 which then pushes the entity group to the InPreempt port of the server block 504, indicating to the server block which entity, if any, should be preempted. Preempted priority 1 entities are sent to the OutPreempt port of the server block and routed to a different part 514 of the model labeled Preempted Customers where the remaining service time is computed. If the remaining service time is greater than zero, then the priority 1 entity is sent back into the priority queue 502 to wait to complete service. Otherwise, the preempted priority 1 entity is routed to the disposer block 516 and the number serviced is updated.

Figure 6:
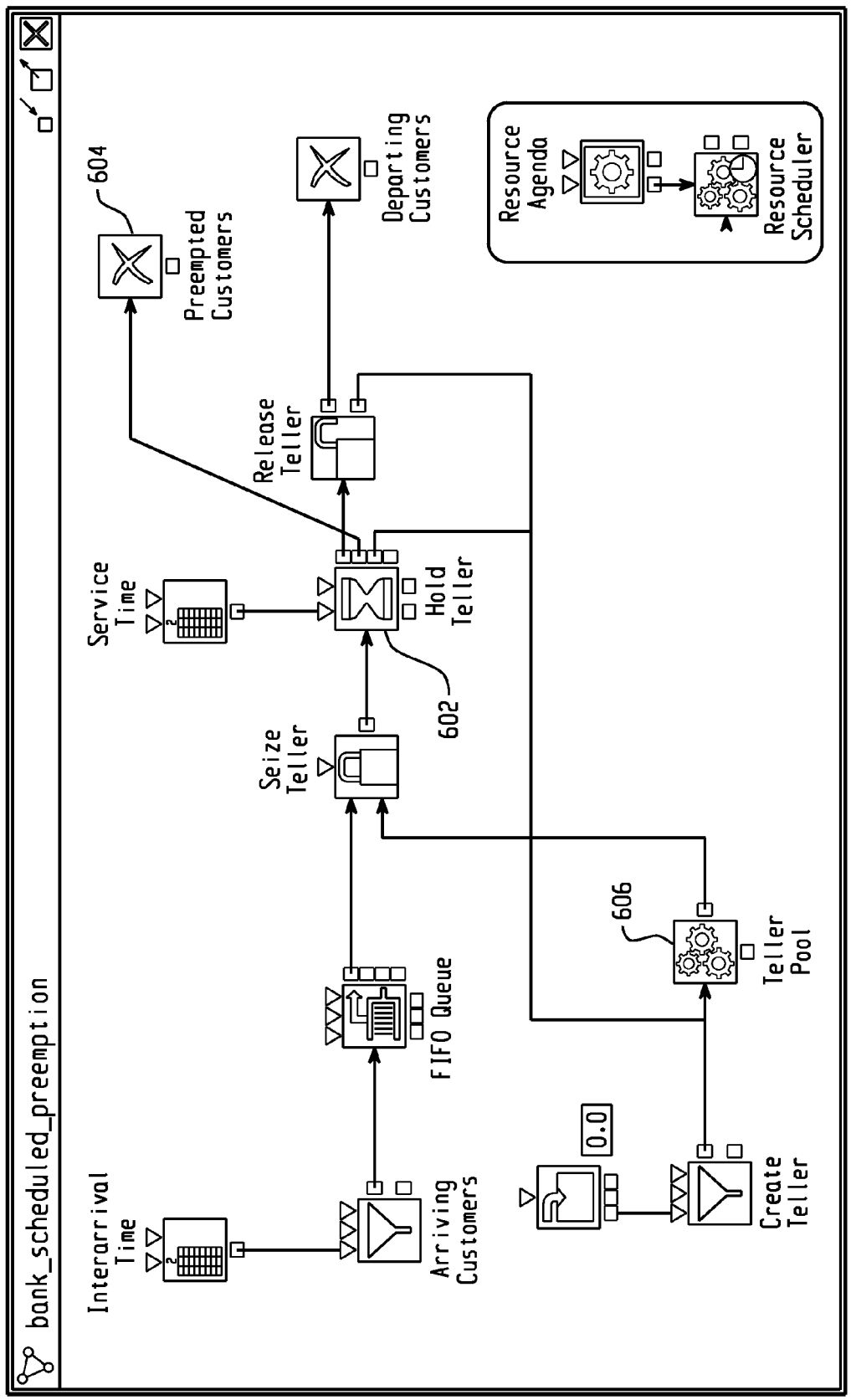
FIG. 6 depicts an example of scheduled preemption in SAS Simulation Studio.

Scheduled preemption is primarily for preempting mobile resources (e.g., resource entities) and is based on the requirements of a resource agenda. Sometimes it is the case that allocated and seized resource entities need to be preempted from their current controlling entities so that the resource entities can be reallocated to other controlling entities or sent to some other part of the model for processing. This type of preemption can be triggered by the immediate actions option in the resource scheduler block (e.g., the user would select to adjust seized resources for the agenda). FIG. 6 shows an example of how scheduled preemption can be modeled in SAS Simulation Studio using a banking example similar to that of FIG. 4. The entity holding blocks, including the queue, server, and delay blocks, provide OutPreempt and OutResource output ports. If a teller resource entity allocated to a customer controlling entity that is currently held in the delay block 602 labeled hold teller is adjusted preemptively, then the delay block attempts to force the customer entity out of the block's OutPreempt port and the resource entity out of the OutResource port. In the model in FIG. 6, the preempted customer entity is routed to a disposer block 604, labeled Preempted Customers, and the teller resource entity is routed back to the teller pool 606. In general, if the OutPreempt port is not connected to a port of another block, then the controlling entity remains in the entity holding block until it completes its service time. If the OutResource port is not connected, then the adjusted resource entity remains allocated to its controlling entity.

The post-processing of preempted entities and resources is often highly specific to the system being modeled. For example, when an entity is preempted from a service, the entity may first be required to finish its remaining service time, as shown in FIG. 5, or the entity might be required to restart its service time from the beginning, or the entity may be required to move on to some other part of the model. SAS Simulation Studio provides the necessary modeling constructs to handle all of these possible situations.

Figure 7A:
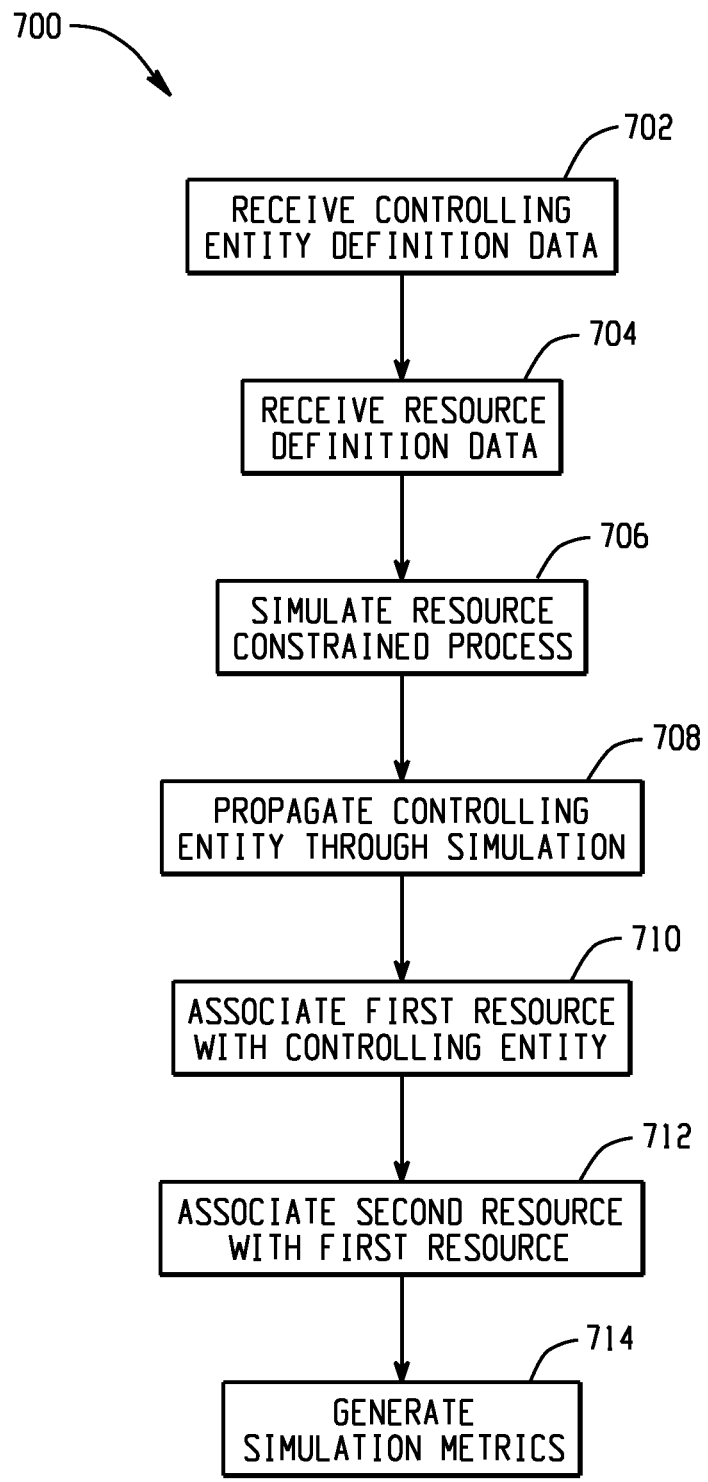
FIGS. 7A and 7B are flow diagrams depicting a computer-implemented method for simulation of a resource constrained process, where the resource constrained process is modified according to metrics generated by the simulation.
Figure 7B:
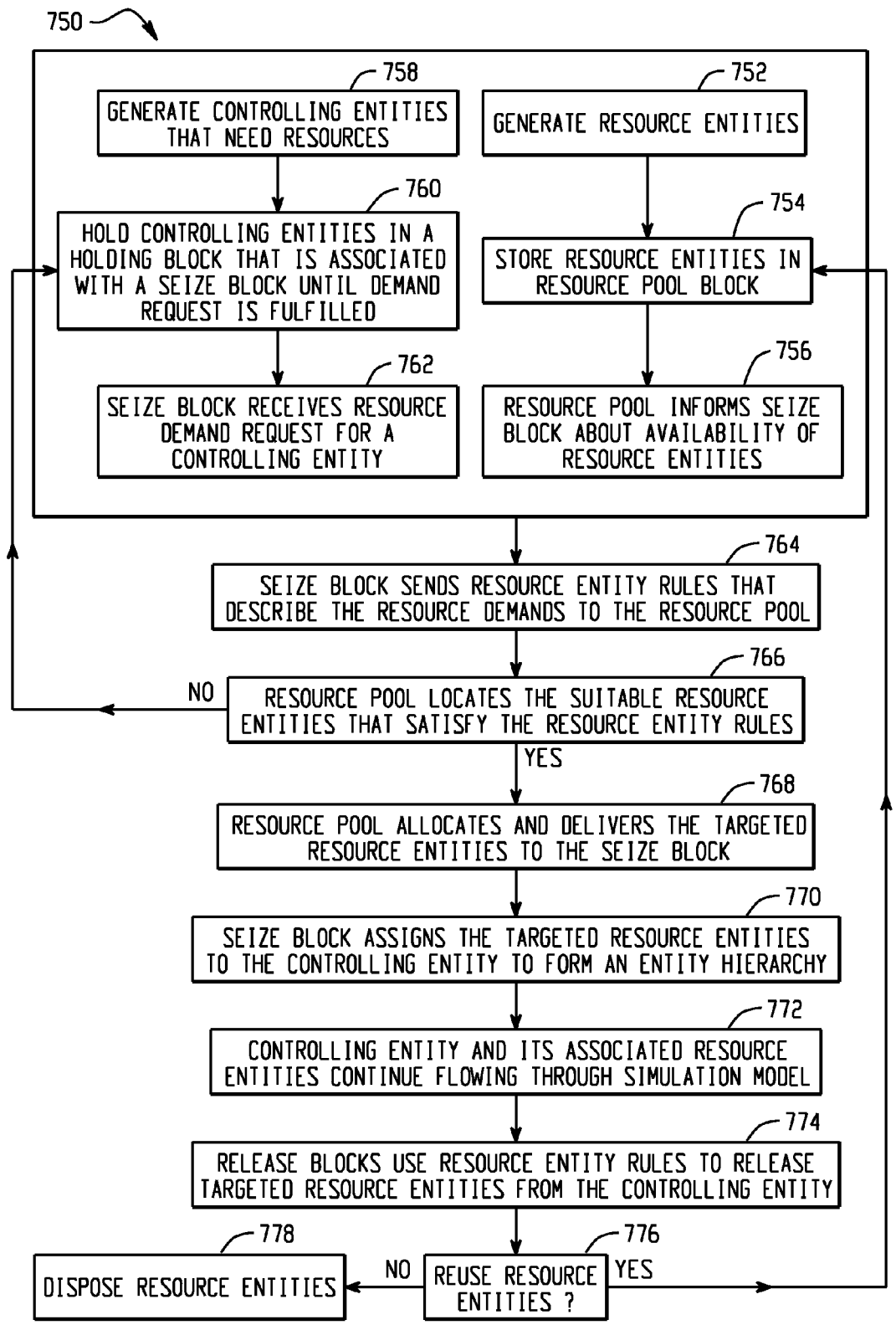

FIGS. 7A and 7B are flow diagrams depicting a computer-implemented method for simulation of a resource constrained process, where the resource constrained process is modified according to metrics generated by the simulation. FIG. 7A depicts a computer-implemented method for simulation of a resource constrained process, where the resource constrained process contains a controlling entity and resources. At 702, controlling entity definition data is received and a controlling entity data structure is populated with the controlling entity definition data, where the controlling entity is configured to control a first resource using a control hierarchy. At 704, first resource definition data is received and a resource data structure is populated with the first resource definition data, where the first resource is configured to control a second resource using the control hierarchy. At 706, the resource constrained process is simulated, where simulating the resource constrained process includes propagating the controlling entity through the simulation of the resource constrained process 708, wherein the resource constrained process contains a plurality of stages, at one of the stages, requesting the first resource be associated with the controlling entity, determining whether the first resource is available by providing a resource availability check comprising a query that includes one or more resource rules that provide constraints on the first resource, and associating the first resource with the controlling entity using the control hierarchy when the first resource is not allocated to another entity and the first resource fulfills the one or more resource rules 710; at a subsequent stage, associating the second resource with the first resource using the control hierarchy 712; and generating simulation metrics as the controlling entity propagates through the simulation of the resource constrained process 714.

In FIG. 7B, resource entities are generated and stored at 752 and stored in a resource pool at 754, where the resource pool informs a seize block about the availability of resource entities at 756. At 758, controlling entities that need resources are generated, and at 760, those controlling entities are held in a holding block that is associated with a seize block until the controlling entities' demand request is fulfilled. At 762, the seize block receives a resource demand request for a controlling entity. At 764, the seize block sends resource entity rules that describe the resource demand to the resource pool. At 766, the resource pool attempts to locate the suitable resource entities that satisfy the resource entity rules. If the resource pool is unable to locate the suitable resources, then the controlling entities are held at 760. If suitable resources are located, then the resource pool allocates the suitable resources and delivers the targeted resource entities to the seize block at 768. The seize block assigns the targeted resource entities to the controlling entity to form an entity hierarchy at 770, and the controlling entity and its associated resource entities continue flowing through the simulation model at 772. A release block uses resource entity rules to release targeted resource entities from the controlling entity at 774. If resource entities are to be reused at 776, then those released resource entities are returned to the resource pool at 754 or otherwise routed within the model. Otherwise, the resource entities are disposed at 778.

Figure 8A:
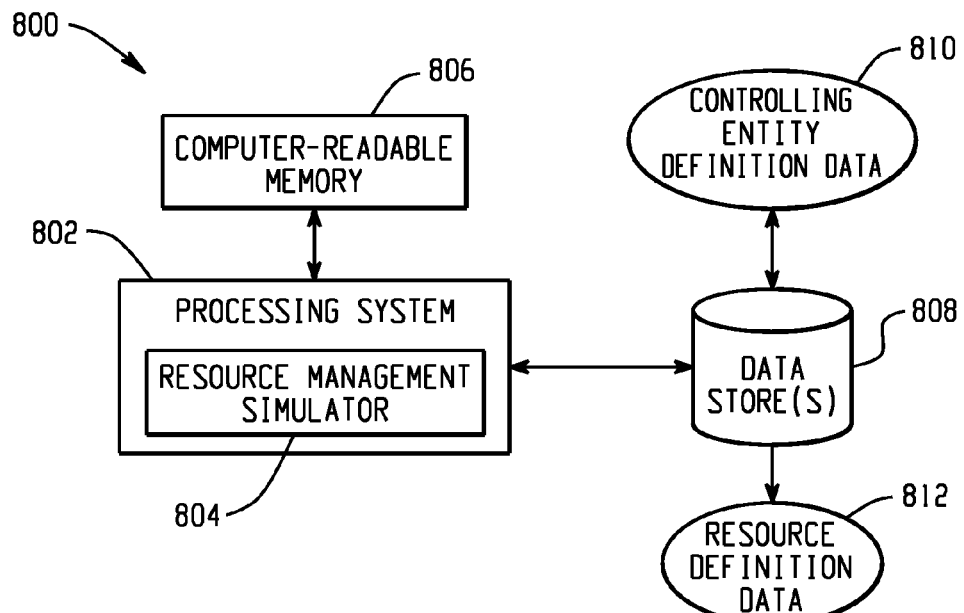
FIGS. 8A, 8B, and 8C depict example processing systems for use in implementing a hierarchy manager.
Figure 8B:
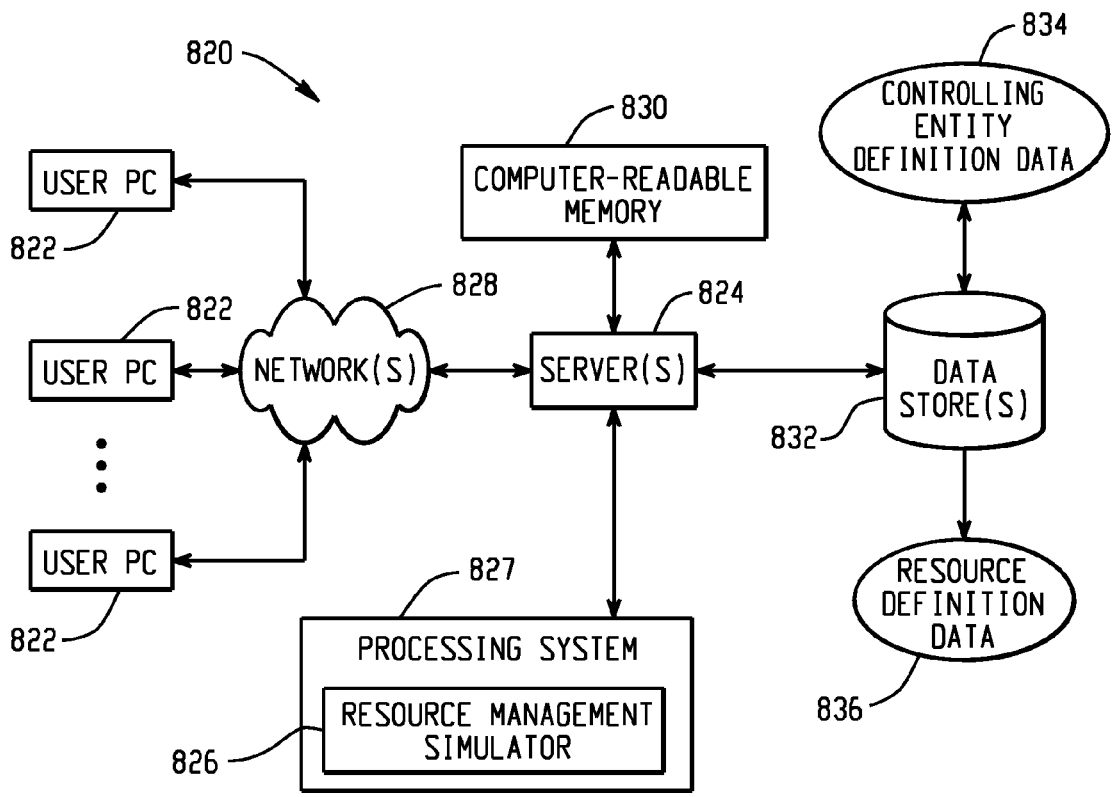
Figure 8C:
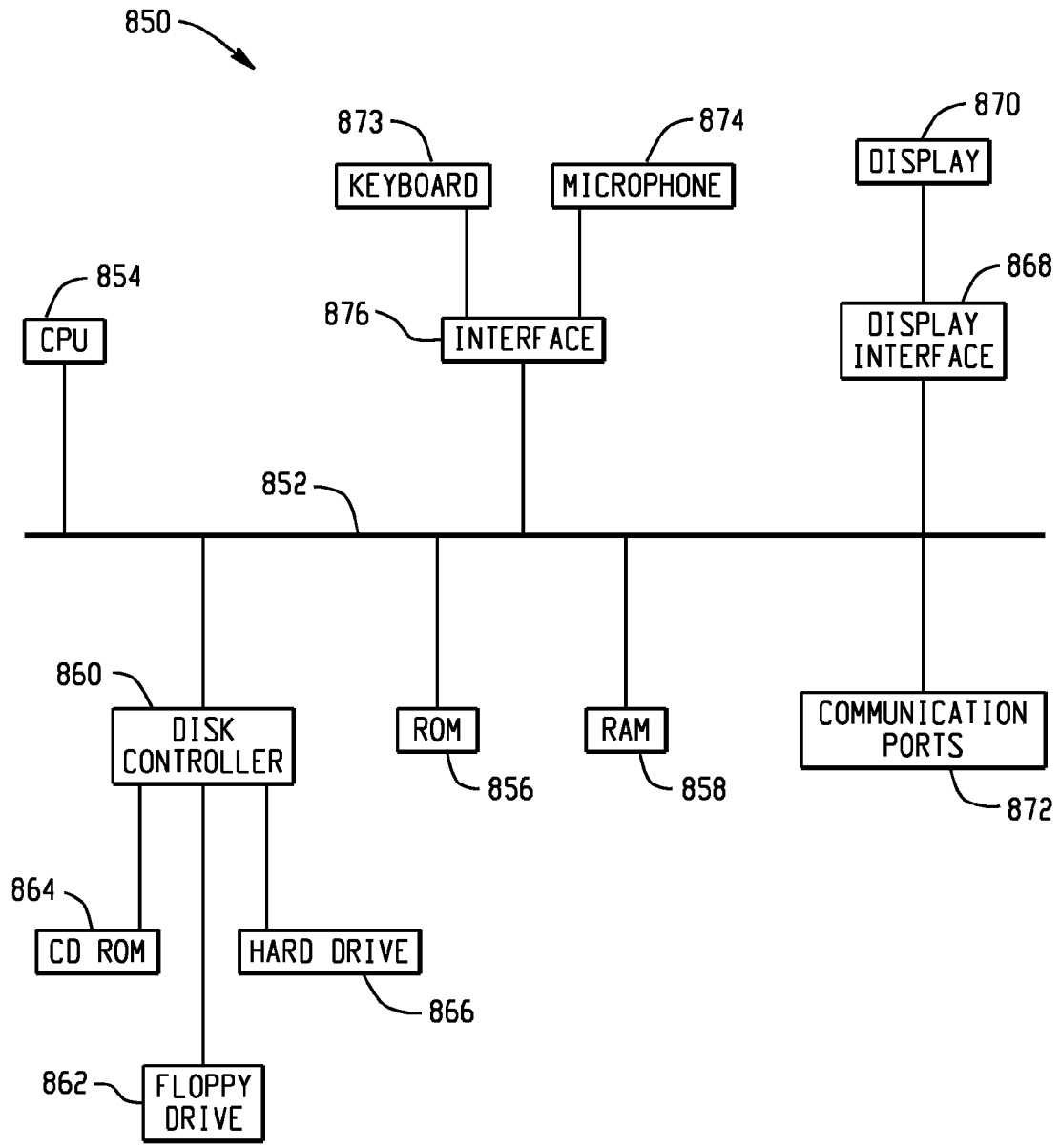

FIGS. 8A, 8B, and 8C depict example processing systems for use in implementing a resource management simulator. For example, FIG. 8A depicts an exemplary system 800 that includes a stand alone computer architecture where a processing system 802 (e.g., one or more computer processors) includes a resource management simulator 804 being executed on it. The processing system 802 has access to a computer-readable memory 806 in addition to one or more data stores 808. The one or more data stores 808 may contain controlling entity definition data 810 as well as resource definition data 812.

FIG. 8B depicts a system 820 that includes a client server architecture. One or more user PCs 822 accesses one or more servers 824 running resource management simulator 826 on a processing system 827 via one or more networks 828. The one or more servers 824 may access a computer readable memory 830 as well as one or more data stores 832. The one or more data stores 832 may contain controlling entity definition data 834 as well as resource definition data 836.

FIG. 8C shows a block diagram of exemplary hardware for a stand alone computer architecture 850, such as the architecture depicted in FIG. 8A, that may be used to contain and/or implement the program instructions of system embodiments of the present invention. A bus 852 may serve as the information highway interconnecting the other illustrated components of the hardware. A processing system 854 labeled CPU (central processing unit) (e.g., one or more computer processors), may perform calculations and logic operations required to execute a program. A processor-readable storage medium, such as read only memory (ROM) 856 and random access memory (RAM) 858, may be in communication with the processing system 854 and may contain one or more programming instructions for performing the method of implementing a resource management simulator. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processor 854 may access each component as required.

A display interface 868 may permit information from the bus 856 to be displayed on a display 870 in audio, graphic, or alphanumeric format. Communication with external devices may optionally occur using various communication ports 872.

In addition to the standard computer-type components, the hardware may also include data input devices, such as a keyboard 873, or other input device 874, such as a microphone, remote control, pointer, mouse and/or joystick.

This written description uses examples to disclose the invention, including the best mode, and also to enable a person skilled in the art to make and use the invention. The patentable scope of the invention may include other examples. For example, a number of examples are provided in the SAS Simulation Studio 1.5 User's Guide, included as Appendix A. As a further example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The invention claimed is:

1. A computer program product for object-oriented event simulation of a resource-constrained process including a resource entity object and a controlling entity object comprising a non-transitory machine-readable storage medium that includes instructions operable to cause a data processing apparatus to perform operations including:

receiving a request for a resource entity object, wherein the request is associated with fulfilling a demand of a controlling entity for a resource, wherein the resource entity object is stored in a resource pool, and wherein the resource entity object includes one or more attributes corresponding to service providing capabilities of the resource;

executing a query to the resource pool using one or more resource rules that describe the demand;

determining that the resource entity object is configured to fulfill the demand, wherein the determination is made based upon the one or more attributes;

allocating the resource entity object to a controlling entity object to form an entity object hierarchy when the one or more attributes of the resource entity object fulfills the one or more resource rules that describe the demand;

scheduling an adjustment action of the resource entity object, wherein the adjustment action is associated with a change in a capacity attribute of the resource entity object or a change in an availability attribute of the resource entity object, and wherein adjustment actions include allocating the resource entity object to the controlling entity object or deallocating the resource entity object from the controlling entity object; and using the resource entity object in accordance with the adjustment action.

2. The computer program product of claim 1, further comprising instructions operable to cause a data processing apparatus to perform operations including:

disposing of the resource entity object.

3. The computer program product of claim 1, further comprising instructions operable to cause a data processing apparatus to perform operations including:

returning the resource entity object to the resource pool.

4. The computer program product of claim 1, further comprising instructions operable to cause a data processing apparatus to perform operations including:

generating simulation metrics.

5. The computer program product of claim 1, wherein the one or more resource rules relate to resource entity object attributes and controlling entity object attributes.

6. The computer program product of claim 1, wherein the one or more resource rules include Boolean rules.

7. The computer program product of claim 1, further comprising instructions operable to cause a data processing apparatus to perform operations including:

placing the controlling entity object in a queue when the resource entity object is not configured to fulfill the one or more resource rules.

8. The computer program product of claim 1, wherein the adjustment action is scheduled according to a resource agenda.

9. The computer program product of claim 1, further comprising instructions operable to cause a data processing apparatus to perform operations including:

identifying a task for the resource entity object that is a higher priority than the demand of the controlling entity object according to the adjustment action, wherein the adjustment action is associated with the task, and wherein the adjustment action is determined by a resource agenda;

deallocating the resource entity object from the controlling entity object and allocating the resource entity object to the task based on the higher priority, wherein deallocating the resource entity object;

placing the controlling entity object in a queue while the resource entity object performs the task; and reallocating the resource entity object to the controlling entity object upon completion of the task.

10. A computer-implemented system for object-oriented event simulation of a resource-constrained process including a resource entity object and a controlling entity object, comprising:

one or more data processors; and one or more non-transitory computer-readable storage media containing instructions operable to cause the one or more processors to perform operations including:

receiving a request for a resource entity object, wherein the request is associated with fulfilling a demand of a controlling entity for a resource, wherein the resource entity object is stored in a resource pool, and wherein the resource entity object includes one or more attributes corresponding to service providing capabilities of the resource;

executing a query to the resource pool using one or more resource rules that describe the demand;

determining that the resource entity object is configured to fulfill the demand, wherein the determination is made based upon the one or more attributes;

allocating the resource entity object to a controlling entity object to form an entity object hierarchy when the one or more attributes of the resource entity object fulfills the one or more resource rules that describe the demand;

scheduling an adjustment action of the resource entity object, wherein the adjustment action is associated with a change in a capacity attribute of the resource entity object or a change in an availability attribute of the resource entity object, and wherein adjustment actions include allocating the resource entity object to the controlling entity object or deallocating the resource entity object from the controlling entity object; and using the resource entity object in accordance with the adjustment action.

11. The system of claim 10, further comprising instructions operable to cause the one or more processors to perform operations including:

disposing of the resource entity object.

12. The system of claim 10, further comprising instructions operable to cause the one or more processors to perform operations including:

returning the resource entity object to the resource pool.

13. The system of claim 10, further comprising instructions operable to cause the one or more processors to perform operations including:

generating simulation metrics.

14. The system of claim 10, wherein the one or more resource rules relate to resource entity object attributes and controlling entity object attributes.

15. The system of claim 10, wherein the one or more resource rules include Boolean rules.

16. The system of claim 10, further comprising instructions operable to cause the one or more processors to perform operations including:

placing the controlling entity object in a queue when the resource entity object is not configured to fulfill the one or more resource rules.

17. The system of claim 10, wherein the adjustment action is scheduled according to a resource agenda.

18. The system of claim 10, further comprising instructions operable to cause the one or more processors to perform operations including:

identifying a task for the resource entity object that is a higher priority than the demand of the controlling entity object according to the adjustment action, wherein the adjustment action is associated with the task, and wherein the adjustment action is determined by a resource agenda;

deallocating the resource entity object from the controlling entity object and allocating the resource entity object to the task based on the higher priority, wherein deallocating the resource entity object;

placing the controlling entity object in a queue while the resource entity object performs the task; and reallocating the resource entity object to the controlling entity object upon completion of the task.

19. A computer-implemented method for object-oriented event simulation of a resource-constrained process including a resource entity object and a controlling entity object, the method comprising:

receiving, at a computing device, a request for a resource entity object, wherein the request is associated with fulfilling a demand of a controlling entity for a resource, wherein the resource entity object is stored in a resource pool, and wherein the resource entity object includes one or more attributes corresponding to service providing capabilities of the resource;

executing a query to the resource pool using one or more resource rules that describe the demand;

determining that the resource entity object is configured to fulfill the demand, wherein the determination is made based upon the one or more attributes;

allocating the resource entity object to a controlling entity object to form an entity hierarchy when the one or more attributes of the resource entity object fulfills the one or more resource rules that describe the demand;

scheduling an adjustment action for the resource entity object, wherein the adjustment action is associated with a change in a capacity attribute of the resource entity object or a change in an availability attribute of the resource entity object, and wherein adjustment actions include allocating the resource entity object to the controlling entity object or deallocating the resource entity object from the controlling entity object; and using the resource entity object in accordance with the adjustment action.

20. The method of claim 19, further comprising:
disposing of the resource entity object.

21. The method of claim 19, further comprising:
returning the resource entity object to the resource pool.

22. The method of claim 19, further comprising:
generating simulation metrics.

23. The method of claim 19, wherein the one or more resource rules relate to resource entity object attributes and controlling entity object attributes.

24. The method of claim 19, wherein the one or more resource rules include Boolean rules.

25. The method of claim 19, further comprising:
placing the controlling entity object in a queue when the resource entity object is not configured to fulfill the one or more resource rules.

26. The method of claim 19, wherein the adjustment action is scheduled according to a resource agenda.

27. The method of claim 19, further comprising:
identifying a task for the resource entity object that is a higher priority than the demand of the controlling entity object according to the adjustment action, wherein the adjustment action is associated with the task, and wherein the adjustment action is determined by a resource agenda;

deallocating the resource entity object from the controlling entity object and allocating the resource entity object to the task based on the higher priority, wherein deallocating the resource entity object;

placing the controlling entity object in a queue while the resource entity object performs the task; and reallocating the resource entity object to the controlling entity object upon completion of the task.

\* \* \* \* \*